United States Patent
Makuta et al.

(10) Patent No.: US 7,389,840 B2
(45) Date of Patent: Jun. 24, 2008

(54) TWO-WHEELED FUEL-CELL VEHICLE WITH HYDROGEN SENSOR

(75) Inventors: Yohei Makuta, Wako (JP); Yoshiyuki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 11/231,473

(22) Filed: Sep. 21, 2005

(65) Prior Publication Data

US 2006/0065461 A1    Mar. 30, 2006

(30) Foreign Application Priority Data

Sep. 29, 2004    (JP) ............... 2004-282972

(51) Int. Cl.
*B60L 11/18* (2006.01)
(52) U.S. Cl. ............. 180/65.3; 180/65.1; 180/68.4
(58) Field of Classification Search ........... 180/65.1, 180/65.2, 65.3, 68.1, 68.4, 68.6
See application file for complete search history.

(56) References Cited

U.S. PATENT DOCUMENTS

| | | | |
|---|---|---|---|
| 6,451,464 B1 * | 9/2002 | Edlund et al. ............. | 429/19 |
| 6,497,970 B1 * | 12/2002 | Fronk ..................... | 429/12 |
| 6,568,496 B1 * | 5/2003 | Huang ..................... | 180/220 |
| 6,679,345 B2 * | 1/2004 | Hirayama et al. .......... | 180/65.3 |
| 6,722,460 B2 * | 4/2004 | Yang et al. ............... | 180/220 |
| 6,755,225 B1 * | 6/2004 | Niedwiecki et al. ........ | 141/231 |
| 6,793,027 B1 * | 9/2004 | Yamada et al. ............ | 180/65.1 |
| 6,810,925 B2 * | 11/2004 | Graham et al. ............. | 141/98 |
| 6,890,672 B2 * | 5/2005 | Dickman et al. ........... | 429/19 |
| 6,913,847 B2 * | 7/2005 | Wells et al. .............. | 429/26 |
| 7,275,569 B2 * | 10/2007 | Hobbs ..................... | 141/97 |

FOREIGN PATENT DOCUMENTS

JP    2003-291849    10/2003

* cited by examiner

*Primary Examiner*—Christopher Ellis
*Assistant Examiner*—Vaughn T Coolman
(74) *Attorney, Agent, or Firm*—Hamre, Schumann, Mueller & Larson, P.C.

(57) ABSTRACT

In a fuel-cell two-wheeled vehicle, a cooling liquid pouring pipe extending from a pipe line of a cooling system to a cooling liquid supply port member is provided in a winding path so as to pass both side portions, a front portion, and a left rear portion of an axis of a head pipe. The cooling liquid supply port member is located on a central axis of width of the vehicle in the vicinity behind the head pipe. A hydrogen sensor for sensing hydrogen gas in the cooling liquid pouring pipe is mounted on an inside surface of a cap for closing an opening. The cap is removably provided.

4 Claims, 8 Drawing Sheets

TWO-WHEELED FUEL-CELL VEHICLE WITH HYDROGEN SENSOR

TECHNICAL FIELD

The present invention relates to a fuel-cell two-wheeled vehicle that runs by the use of electric power generated by supplying reaction gas and hydrogen gas to a fuel cell and, in particular, to a fuel-cell two-wheeled vehicle provided with a hydrogen sensor for sensing hydrogen gas.

BACKGROUND OF THE INVENTION

In recent years fuel-cell vehicles have been developed in which a motor is supplied with electric power generated by a fuel cell system to drive wheels. In the fuel cell system, the chemical reaction of hydrogen gas and oxygen as reaction gas generates electric power in a fuel cell stack (hereafter simply referred to as "fuel cell"). Here, the oxygen is taken in via a compressor from air and the hydrogen gas is supplied from a high-pressure fuel cylinder.

The fuel-cell vehicle has a hydrogen sensor for sensing hydrogen gas and a mounting structure in which the hydrogen sensor is mounted via a bracket between roof members (see, for example, JP-A No. 291849/2003). According to such a mounting structure, the hydrogen sensor is arranged at a high position to be able to improve the accuracy of sensing hydrogen leakage, which is preferable.

The structure disclosed in JP-A No. 291849/2003 is applied to a four-wheeled vehicle having a roof and it is difficult to apply the structure to a two-wheeled vehicle having no roof. Moreover, a two-wheeled vehicle is smaller in size than a four-wheeled vehicle and hence it is desired to utilize a mounting space effectively.

Further, a common fuel-cell vehicle is provided with a liquid-cooled cooling system for cooling the fuel cell and it is desired to more surely sense that hydrogen gas is mixed in the pipe of the cooling system.

The present invention has been made in consideration of such a problem. One object of the present invention is to provide a fuel-cell two-wheeled vehicle having a sensor mounted in an effective arrangement space and capable of sensing hydrogen gas more surely. Another object of the present invention is to provide a fuel-cell two-wheeled vehicle that more surely senses hydrogen gas mixed in the pipe of a cooling system.

SUMMARY OF THE INVENTION

A fuel-cell two-wheeled vehicle in accordance with the present invention is a fuel-cell two-wheeled vehicle of the type running by the use of electric power generated by supplying reaction gas and hydrogen gas to a fuel cell and including a liquid-cooled type cooling system for cooling the fuel cell, including a head pipe for supporting a front fork for a front wheel in such a way as to freely steer the front fork; and a hydrogen sensor provided near the head pipe for sensing hydrogen gas leaking from the fuel cell. By mounting the hydrogen sensor near the head pipe in this manner, a dead space is effectively utilized and hence the hydrogen sensor can be mounted in an effective arrangement space. Moreover, the hydrogen sensor is arranged at a high position and hence the hydrogen gas can be sensed with more reliability.

Further, a liquid-cooled type cooling system for cooling the fuel cell may be provided, and a cooling liquid supply port for pouring a cooling liquid into the cooling system may be provided near the head pipe, and the hydrogen sensor may be mounted in the cooling liquid supply port. With this, the hydrogen gas mixed into the pipe line of the cooling system can be sensed with more reliability.

When the hydrogen sensor is mounted on a cap for closing the cooling liquid supply port, it is arranged at the high position of the cooling system and hence can easily sense hydrogen gas. Moreover, when the cap is removed, the hydrogen sensor is also removed together, so that the hydrogen sensor does not interrupt the pouring work of the cooling liquid and the cooling liquid does not adhere to the hydrogen sensor.

Moreover, when the hydrogen sensor is mounted behind the head pipe, a dead space can be further effectively utilized.

Further, when a cooling liquid pouring pipe extending from the pipe line of the cooling system to the cooling liquid supply port is set as a winding path in such a way as to surround at least a front portion and side portions of an axis of the head pipe when viewed from top plan, a region of a sufficient amount of air is secured between the surface of liquid and the cooling liquid supply port. Hence, even if the cooling liquid is moved or vibrated, it is possible to prevent the cooling liquid from adhering to the hydrogen sensor.

DETAILED DESCRIPTION OF THE INVENTION

Hereafter, a fuel-cell two-wheeled vehicle in accordance with the present invention is described in a preferred embodiment and with reference to the accompanying drawings FIG. 1 to FIG. 8. Hereafter, mechanisms mounted on a one-by-one basis on the left and right sides of a fuel-cell two-wheeled vehicle 10 are described distinctively by appending "L" to the reference symbol of features on the left side and by appending "R" to the reference symbol of features on the right side.

Figure 1:
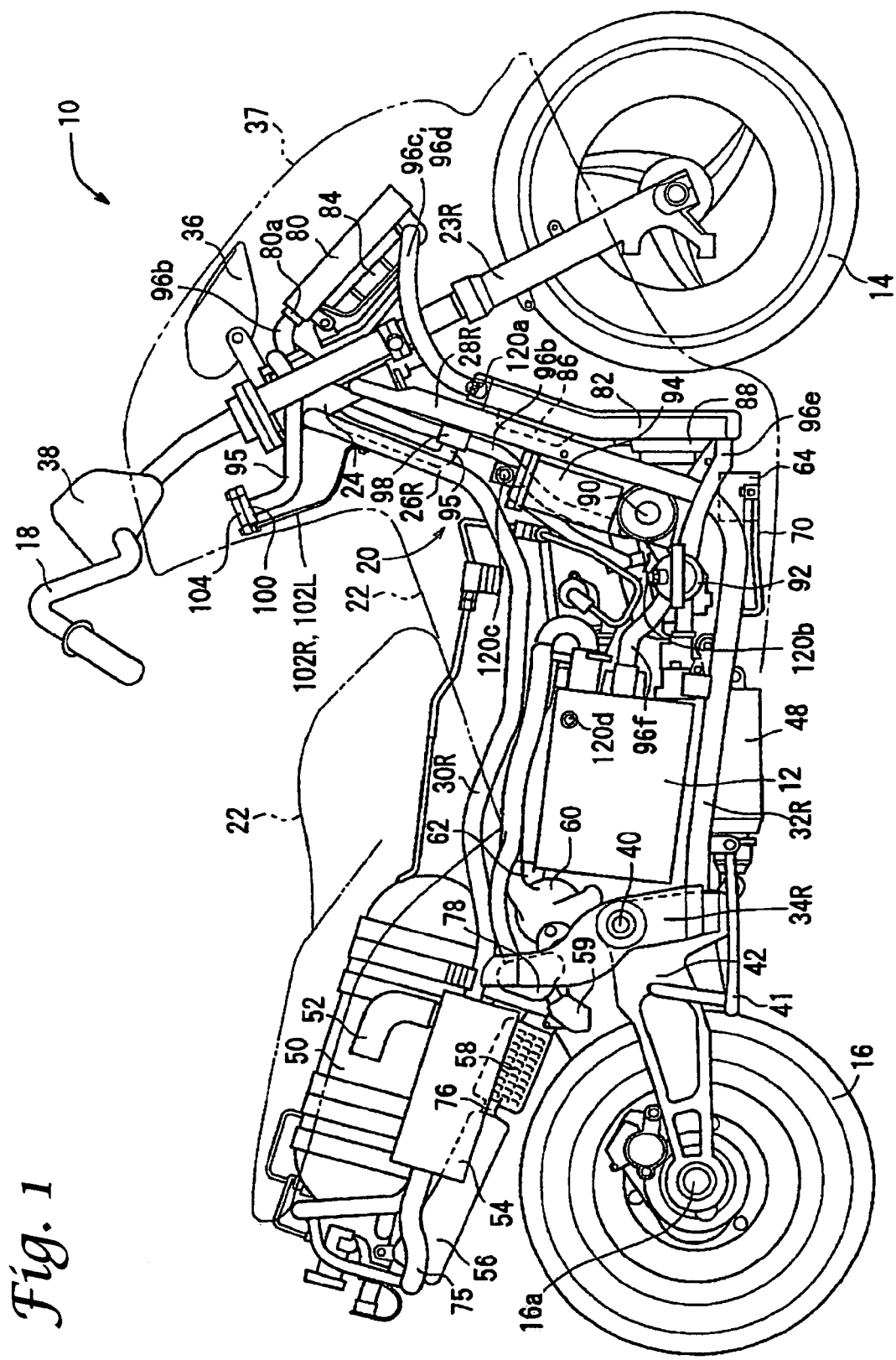
FIG. 1 is a right side view of a fuel-cell two-wheeled vehicle in accordance with the present embodiment.
Figure 2:
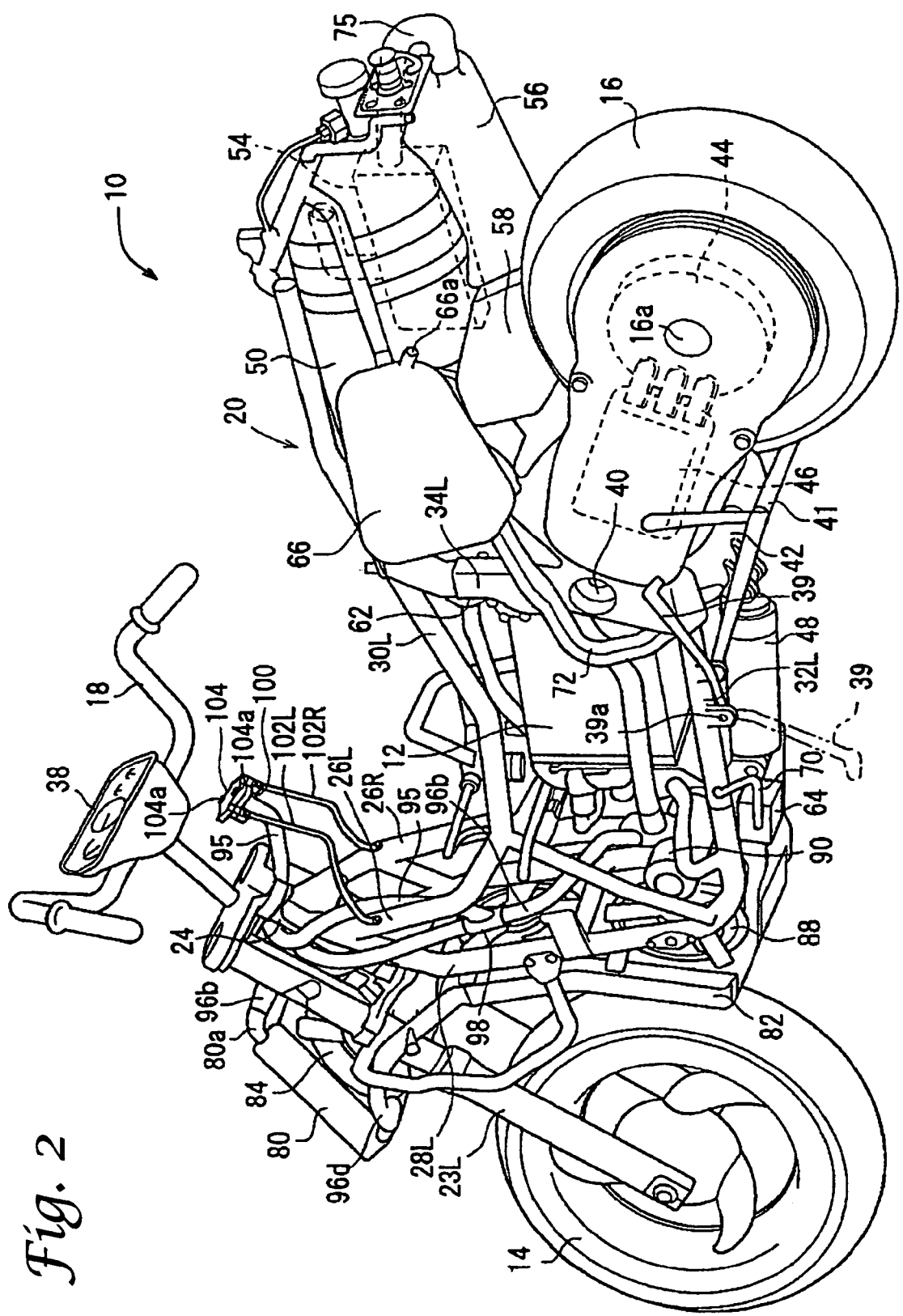
FIG. 2 is a perspective view when viewed from a left lower rearward location of the fuel-cell two-wheeled vehicle in accordance with the present embodiment.
Figure 3:
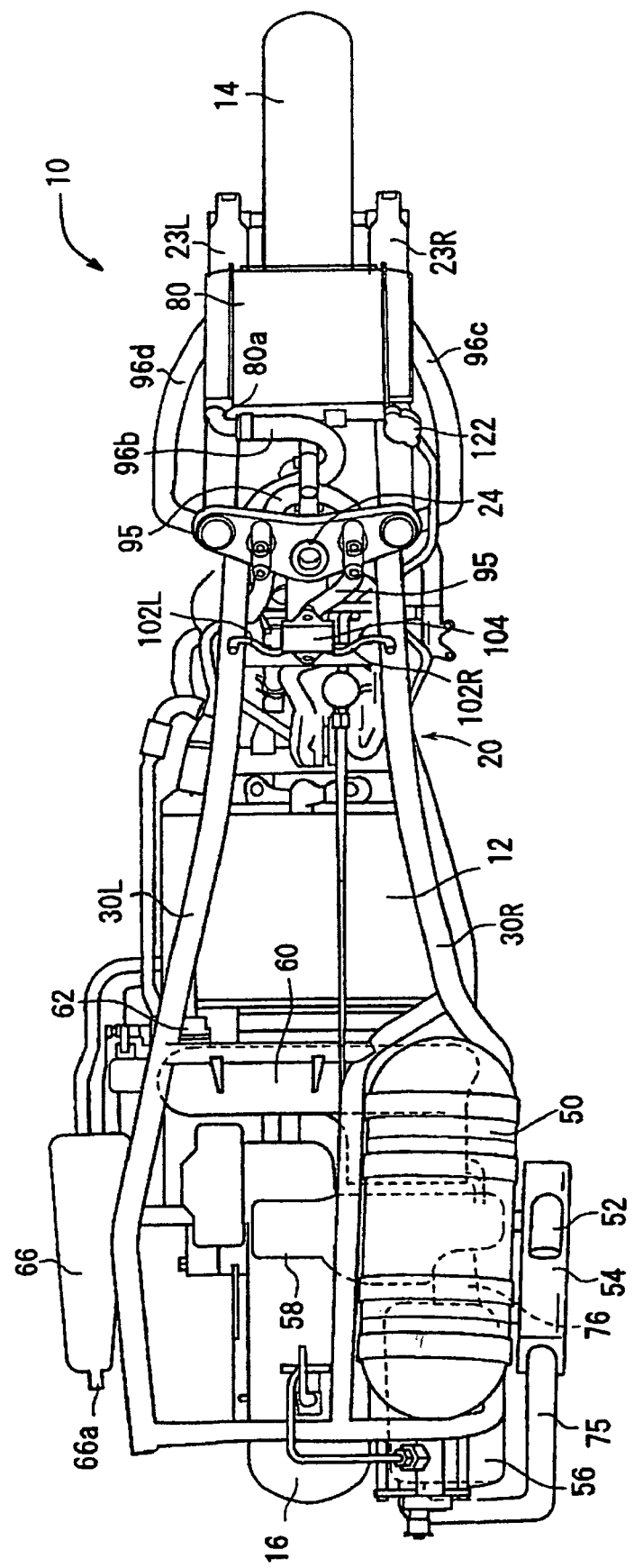
FIG. 3 is a plan view of the fuel-cell two-wheeled vehicle in accordance with the present embodiment.

As shown in FIG. 1 to FIG. 3, a scooter type fuel-cell two-wheeled vehicle 10 as a fuel-cell two-wheeled vehicle in accordance with the present embodiment is mounted with a fuel cell 12 and runs by the use of electric power supplied from the fuel cell 12. In the fuel cell 12, hydrogen gas supplied to an anode electrode reacts with reaction gas (air) supplied to a cathode electrode to generate electric power. In the present embodiment, a well-known fuel cell is employed as the fuel cell 12 and hence the fuel cell 12 will not be described here in detail. The fuel-cell two-wheeled vehicle 10 includes a front wheel 14 that is a steering wheel, a rear wheel 16 that is a driving wheel, a handlebar 18 for steering the front wheel 14, a frame 20, and a seat 22 on which a rider and a passenger sit.

Moreover, the fuel-cell two-wheeled vehicle 10 includes a water-cooled type cooling system 79 (see FIG. 4) for cooling the fuel cell 12 to keep it within a suitable temperature range so as to efficiently generate electric power.

The frame 20 includes a head pipe 24 for journaling fork-type front suspensions 23R, 23L on the front side, a pair of upper down frames 26R, 26L and a pair of lower down frames 28R, 28L whose front portions are connected to the head pipe 24 and which are inclined downward toward the back of the vehicle body. The frame 20 further includes: upper frames 30R, 30L which extend upward continuously from the upper down frames 26R, 26L toward the back of the vehicle body; lower frames 32R, 32L which extend continuously from the lower down frames 28R, 28L toward the rear wheel 16; and vertical frames 34R, 34L which connect the rear end portions of the lower frames 32R, 32L to the nearly middle portions of the upper frames 30R, 30L, respectively.

The fuel cell 12 is mounted nearly in the central portion of the vehicle body. Specifically, the fuel cell 12 is mounted in the rear portion of a region partitioned by the upper frames 30R, 30L, the lower frames 32R, 32L, and the vertical frames 34R, 34L and is arranged in a position slightly rising backward. The fuel cell 12 is a part having a comparatively large weight among parts constructing the fuel-cell two-wheeled vehicle 10. Mounting the fuel cell 12 nearly in the central portion of the vehicle body can provide the fuel-cell two-wheeled vehicle 10 with suitable weight balance to improve driving performance.

Moreover, an electrically operated pump 90 and the like, which will be described later, is mounted forward of the fuel cell 12 in the region partitioned by the upper frames 30R, 30L, the lower frames 32R, 32L, and the vertical frames 34R, 34L. The seat 22 is mounted above the upper frames 30R, 30L and a tail lamp (not shown) is mounted on the rear end. A head light 36 is mounted forward of the head pipe 24 and is covered with a front cover 37.

A side stand 39 of a rotary pull-out type is mounted on the left side of the central lower portion of the vehicle body. The side stand 39 can turn approximately 90° around the shaft part 39a of the lower frame 32L when a rider who got off operates the side stand 39 with his foot. This side stand is arranged such that when it is received, it is lifted backward to be brought into line with the lower frame 32L. Further, when the side stand 39 is pulled out, it is extended in a slanting and downward direction on the left side to support the vehicle body inclined on the left side, thereby allowing the rider to park the vehicle. Still further, the fuel-cell two-wheeled vehicle 10 can include a center stand 41 in place of the side stand 39 and with the center stand 41 the vehicle can be parked with the vehicle body held upright.

The front wheel 14 is rotatably journaled by the lower end portions of the front suspensions 23R, 23L. The handlebar 18 is coupled to the upper portions of the front suspensions 23R, 23L, and a meter 38 is fixed to the central portion of the handlebar 18. The rear wheel 16 is supported by a swing arm 42 rotatable around a pivot 40 fixed to the vertical frames 34R, 34L and is mounted with an in-wheel motor 44 and a motor driver 46 for driving the in-wheel motor 44.

The in-wheel motor 44 and the motor driver 46 are of a water-cooled type and are highly efficient and of high power. A rear suspension 48 is provided under the fuel cell 12 in such a way as to extend in the direction of the length of the vehicle and both end portions thereof are turnably coupled to the lower frames 32R, 32L and the swing arm 42. A minimum ground clearance is set for the fuel cell 12 in terms of design, but by providing the rear suspension 48 under the fuel cell 12 a region between the fuel cell 12 and the ground is used effectively, and the center of gravity of the fuel-cell two-wheeled vehicle 10 is lowered.

In additions, the fuel-cell two-wheeled vehicle 10 includes: a fuel cylinder 50 for storing high pressure hydrogen gas to be supplied to the fuel cell 12; a resonator 54 for reducing intake noise from an intake port 52 which resonator is open to the back; and an air cleaner 56 for taking in outside air via the resonator 54. The intake port 52 is formed in the top surface of the front portion of the resonator 54 and is gently bent approximately 90° and is open to the back.

The fuel-cell two-wheeled vehicle 10 further includes: a compressor (also referred to as supercharger pump, or supercharger) 58 for compressing air cleaned by the air cleaner 56 to make reaction gas; an inter-cooler 59 for cooling the reaction gas compressed by the compressor 58; a humidifier 60 for exchanging moisture between the reaction gas supplied to the fuel cell 12 and the reaction gas used by and discharged from the fuel cell 12; a back pressure valve 62 provided on the discharge side of the humidifier 60 so as to adjust pressure in the fuel cell 12; a dilution box 64 for diluting the used reaction gas by the used oxygen gas; and a silencer 66 for silencing the diluted reaction gas and for discharging it as exhaust gas to the atmosphere. Moreover, the fuel-cell two-wheeled vehicle 10 is provided with a secondary battery (not shown) mounted near the front fork as the auxiliary power supply of the fuel cell system.

The fuel cylinder 50 is formed in the shape of a cylinder having hemispheres at both ends and is mounted at a position offset to the right from the center in the rear portion of the vehicle body. Specifically, the fuel cylinder 50 extends in the direction of length of the vehicle body when viewed from the top (see FIG. 3) and is mounted in such a way as to incline upward toward the back along the seat 22 and the upper frame 30R when viewed from the side (see FIG. 1). The fuel cylinder 50 is a comparatively large part among parts constructing the fuel-cell two-wheeled vehicle 10, but because the fuel cylinder 50 is mounted at a position offset from the center line, it hardly overlaps the rear wheel 16 when viewed from the top and hence can sufficiently benefit from a suspension stroke in the up and down direction of the rear wheel 16. With this, impact from the road is easily damped and hence the ride comfort of the fuel-cell two-wheeled vehicle 10 is improved.

The dilution box 64 is mounted in a lower end portion between the pair of lower down frames 28R, 28L and is arranged at a position lower than the fuel cell 12. Hence, moisture generated in the fuel cell 12 is easily accumulated in the dilution box 64 and the accumulated moisture is discharged from the bottom surface portion of the dilution box 64.

The first exhaust pipe 70 is connected to the dilution box 64 and exhaust gas is discharged from the first exhaust pipe 70. The first exhaust pipe 70 extends from a portion closer to the front portion than the center in the lower frame 32L through the inside of the lower frame 32L to the back and its rear end portion connects with one end of the second exhaust pipe 72. The second exhaust pipe 72 is bent at a slightly higher portion than the rear end portion of the lower frame 32L, thereby being directed backward in a slanting and upward direction, and is connected to the silencer 66.

The silencer 66 is formed in a nearly square flat shape elongated in the longitudinal direction and is offset to the left from the center in the rear portion of the vehicle body and is so mounted as to extend in the direction of length of the vehicle at a position higher than the rear wheel 16. A discharge port 66a for discharging exhaust gas from the silencer 66 is formed below the rear end portion of the silencer 66. The discharge port 66a is located slightly backward of the axle 16a of the rear wheel 16 in the direction of length of the vehicle.

The resonator 54 is formed in a nearly square flat shape elongated in the longitudinal direction and is mounted on the right side of the fuel cylinder 50. The rear end portion of the resonator 54 is connected to the rear end portion of the air cleaner 56 by a resin pipe 75.

The air cleaner 56 is formed in a slightly flat shape and is so arranged as to be inclined up toward the back below the rear portion of the fuel cylinder 50. Air passing through the air cleaner 56 is introduced through a short resin pipe 76 into the right end portion of the compressor 58. The compressor 58 is so mounted as to extend in the direction of width of the vehicle and its right end portion is located below the central portion of the fuel cylinder 50. The humidifier 60 is formed in a shape elongated in the direction of width of the vehicle and is interposed between the compressor 58 and the fuel cell 12.

The inter-cooler 59 is mounted below the front portion of the fuel cylinder 50, and its air flow inlet and air flow outlet are connected to the compressor 58 and the humidifier 60, respectively. As described above, the inter-cooler 59 cools outside air compressed by the compressor 58 and supplies it to the humidifier 60. On startup at low temperatures, by switching a bypass valve 78, the compressed outside air can be supplied to the fuel cell 12 without passing through the intercooler 59 and the humidifier 60.

Figure 4:
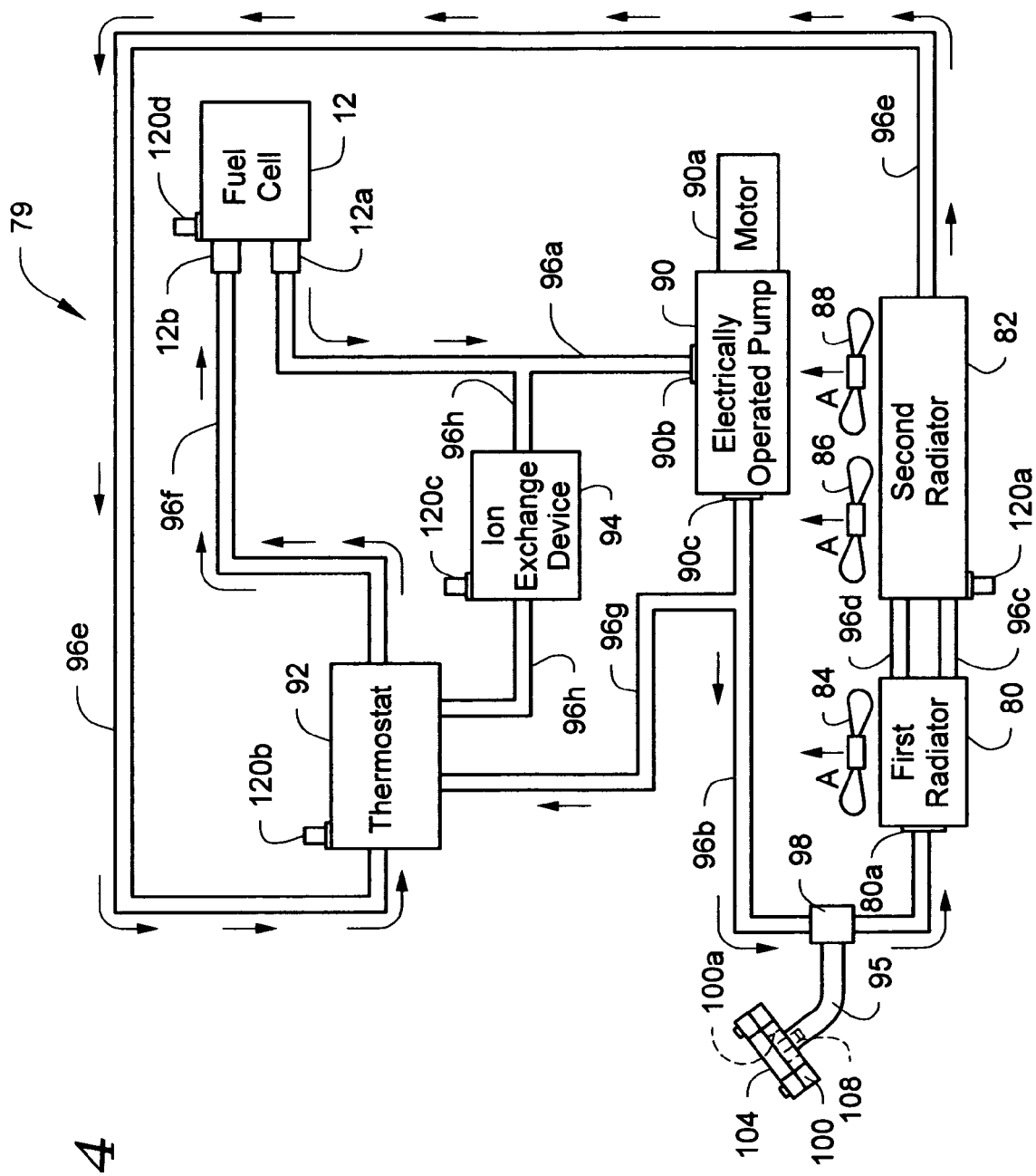
FIG. 4 is a block diagram of a cooling system in the fuel-cell two-wheeled vehicle.

Next, a water-cooled cooling system for cooling the fuel cell 12 and keeping it within a suitable temperature range will be described mainly by referring to FIG. 4.

The cooling system 79 includes: a first radiator 80 and a second radiator 82 which allow cooling water heated by the fuel cell 12 to dissipate heat with the cooling fins of the radiators; a cooling fan 84 for passing air through the cooling fins of the first radiator 80; two cooling fans 86 and 88 for passing air through the cooling fins of the second radiator 82; an electrically operated pump 90 for circulating the cooling water; a thermostat 92 for switching the circulation path of the cooling water at the time of warm-up and supercooling; an ion exchange device 94 for removing ions in the cooling water to prevent the fuel cell 12 from developing a short circuit; and a cooling liquid pouring pipe 95 for pouring a cooling liquid into the cooling system 79.

The respective cooling fans 84, 86, and 88 suck air from the first radiator 80 and the second radiator 82 at the back surface of the first radiator 80 and the second radiator 82, whereby air flows in the manner shown by arrows A. Among this, wind caused by the cooling fan 88 is so directed as to hit the electrically operated pump 90.

The electrically operated pump 90 is provided with a motor 90a, and the motor 90a is electrically rotated and driven to drive a pump part, thereby being able to circulate the cooling water through the cooling system 79. The suction port 90b of the electrically operated pump 90 is connected to the cooling water discharge port 12a of the fuel cell 12 by a pipe line 96a, and the discharge port 90c of the electrically operated pump 90 is connected to the cooling water discharge port 12b of the fuel cell 12 by a pipe line 96g/f.

Figure 5:
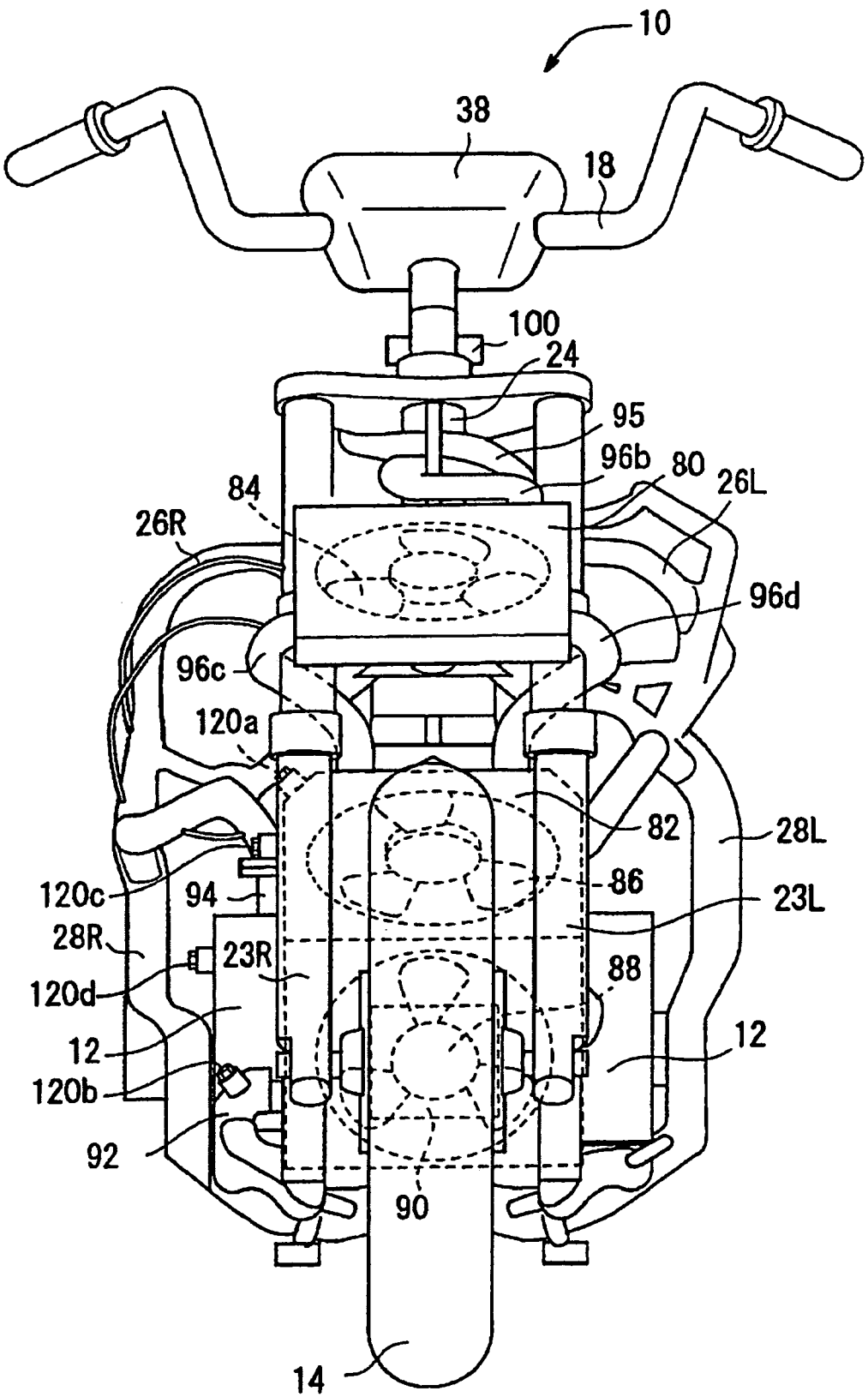
FIG. 5 is a front view of the fuel-cell two-wheeled vehicle in accordance with the present embodiment.

The lower portion of the first radiator 80 is connected to the upper portion of the second radiator 82 by two left and right pipe lines 96c and 96d (see FIG. 5). One end portion of the thermostat 92 is connected to the lower portion of the second radiator 82 by a pipe line 96e and the other end portion is connected to the cooling water suction port 12b of the fuel cell 12 by a pipe line 96f. The cooling pipe 96b between the electrically operated pump 90 and the first radiator 80 branches out into a pipe line 96g, which is connected to the thermostat 92. The cooling pipe line 96a between the fuel cell 12 and the electrically operated pump 90 branches out into a pipe line 96h, which is connected via the ion exchange device 94 to the thermostat 92.

At the time of warm-up and supercooling, the thermostat 92 makes the pipe line 96g connect with the pipe line 96f and interrupts the pipe line 96e. With this, the cooling water discharged from the electrically operated pump 90 flows into the pipe line 96g and does not pass through the first radiator 80 and the second radiator 82. Hence, the cooling water is prevented from being cooled unnecessarily and hence warm-up can be quickly performed.

On the other hand, during normal operation, the thermostat 92 causes the pipe line 96e to connect with the pipe line 96f and interrupts the pipe line 96g. With this, the cooling water which is heated and discharged from the electrically operated pump 90 dissipates heat and hence is cooled by the first radiator 80 and the second radiator 82 and then is introduced through the thermostat 92 to the cooling water suction port 12b of the fuel cell 12. The cooling water which cools the electric power generating cell (not shown) in the fuel cell 12 thereby being heated by it is discharged from the cooling water discharge port 12a and then is introduced into the electrically operated pump 90, thereby being circulated. Moreover, part of the cooling water is passed through the ion exchange device 94 and is circulated.

As shown in FIG. 5, the first radiator 80 is formed in the shape of a nearly square flat plate and is mounted on the front surface of the head pipe 24. The cooling fan 84 is mounted on the back surface of the first radiator 80. The second radiator 82 is formed in the shape of a plate with height and area nearly two times that of the first radiator 80 and is mounted just in front of the lower down frames 28R and 28L in such a way as to be along the lower down frames 28R and 28L. The cooling fan 86 is mounted on the upper portion of the back surface of the second radiator 82 and the cooling fan 88 is mounted on the lower portion of the back surface thereof. The electrically operated pump 90 is interposed between the cooling fan 88 and the fuel cell 12. The ion exchange device 94 is formed in the shape of a square cylinder elongated in the direction of length and is so mounted as to be along the right lower down frame 28R.

Figure 6:
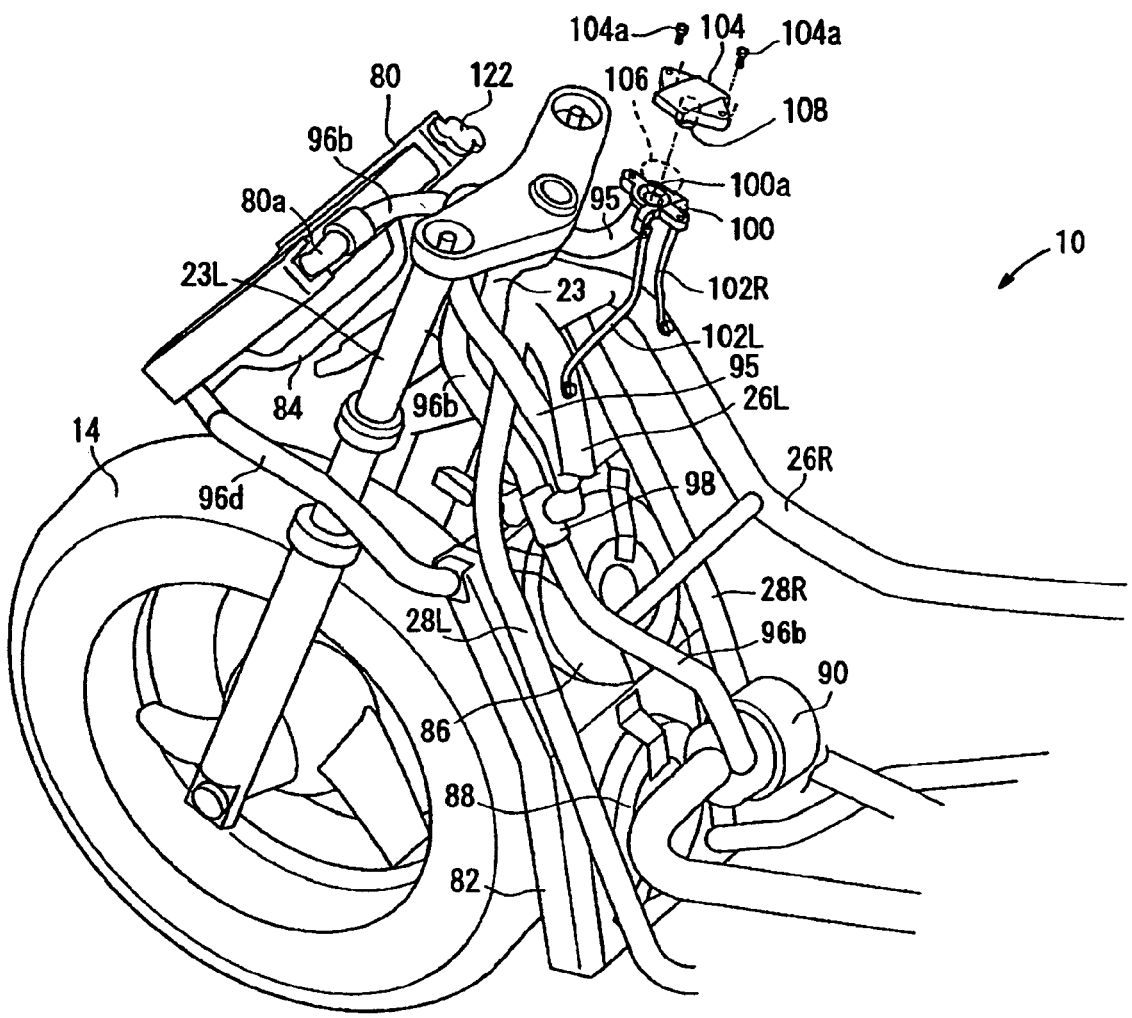
FIG. 6 is a perspective view when viewed from a downward slant and rearward location of a cooling liquid supply pipe and its vicinity.
Figure 7:
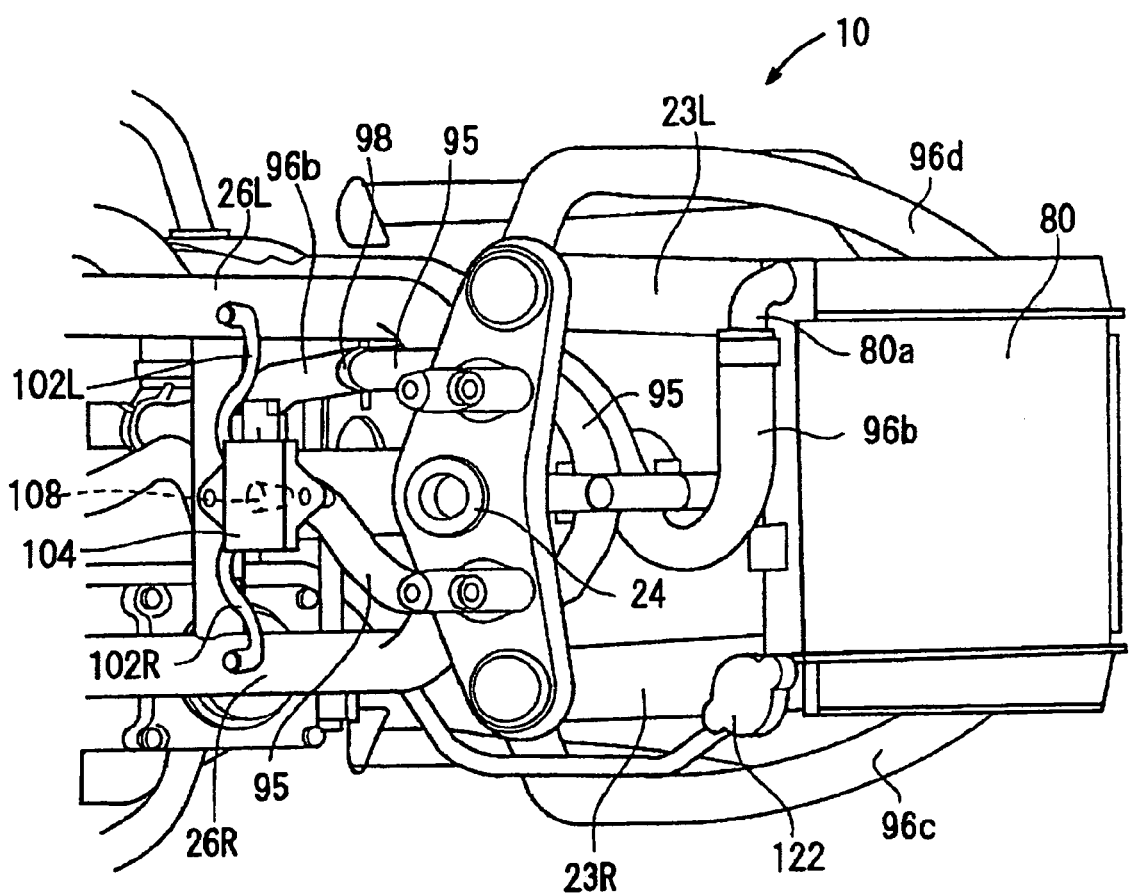
FIG. 7 is a plan view of the cooling liquid supply pipe and its vicinity.

As shown in FIG. 6 and FIG. 7, the pipe line 96b extends from the electrically operated pump 90 and then bends at a slightly upper position in a slant and left direction and then extends upward nearly along the lower down frame 28L and then passes between the left front suspension 23L and the head pipe 24 and connects with the connection port 80a formed in the left portion of the top surface of the first radiator 80.

The cooling liquid pouring pipe 95 branches out upward from a branch coupling 98 nearly at the middle portion of the pipe line 96b. The cooling liquid pouring pipe 95 extends upward in parallel to the upper side of the pipe line 96b, then passes between the left front suspension 23L and the head pipe 24, then passes forward of the head pipe 24, then passes between the right front suspension 23R and the head pipe 24, and then extends nearly in a spiral shape in such a way as to wind around the head pipe 24 to its rear side. The tip of the cooling liquid pouring pipe 95 is directed backward in the slant and upward direction and is located on the central axis of width of the vehicle nearly behind the head pipe 24. That is, the cooling liquid pouring pipe 95 is set as a winding path in such a way as to surround both of the side portions, the front portion, and the rear portion in a right and slant direction of the axis of the head pipe 24 when viewed from the top plan.

The tip of the cooling liquid pouring pipe 95 is provided with a cooling liquid supply port member 100 and an opening 100a (see FIG. 6), which is open in the slant and upward direction and connects with cooling liquid pouring pipe 95.

In the fuel-cell two-wheeled vehicle 10, by providing the cooling liquid supply port member 100 in the region of this dead space, the space is effectively utilized. Moreover, since the cooling liquid supply port member 100 is provided on the central axis of width of the vehicle, it does not hit the knees of the rider and can realize the design of good balance in terms of vision and of little running air resistance because it is laterally symmetric when it is covered with a cowling or the like.

The cooling liquid supply port member 100 is located at a higher position than the connection port 80a to the first radiator 80 and is at the highest position in all of the pipe lines of the cooling system 79. Specifically, the cooling liquid supply port member 100 is provided at a position slightly higher than the top end portion of the head pipe 24.

The cooling liquid supply port member 100 has its lower end fixedly supported by stays 102R and 102L fixed to portions close to the top ends of the upper down frames 26R and 26L by bolts. A hydrogen sensor 108 for sensing hydrogen gas in the cooling liquid pouring pipe 95 is mounted on the inside surface (surface closing the opening 100a) of a cap 104 for closing the opening 1100a and the cap 104 functions as a member for mounting the hydrogen sensor 108, whereby the parts are reduced in number.

The hydrogen sensor 108 senses hydrogen gas on the basis of the difference in electric resistance between a sensing element, which is heated to a high temperature by utilizing heat generated when the hydrogen gas of gas to be sensed is brought into contact with a catalyst such as platinum, and a temperature compensating element at atmospheric temperature. The sensing signal of the hydrogen sensor 108 is supplied to an ECU (electric control unit, not shown) and is subjected to a predetermined processing.

As shown in FIG. 6, the cap 104 is removably mounted to the cooling liquid supply port member 100 by bolts 104a and when the cap 104 is removed, the opening 100a is exposed and hence can be refilled with the cooling liquid via a funnel 106 or the like from the cooling liquid pouring pipe 95.

In addition, the cooling system 79 is provided with four gas purging portions 120a, 120b, 120c, and 120d for purging gas to the outside.

As shown in FIG. 1, the gas purging portions 120a, 120b, 120c, and 120d are provided respectively at the right upper portions of the second radiator 82, the thermostat 92, the ion exchange device 94, and the fuel cell 12 and connect with the right upper corners in the inner spaces of the respective parts. The gas purging portions 120a and 120c point upward in a right slanting direction, and the gas purging portions 120b and 120d point to the right.

In the fuel-cell two-wheeled vehicle 10 constructed in this manner, the cooling liquid supply port member 100 is provided at the highest position in the cooling system 79 and hence when the cooling liquid is refilled through the opening 100a, the cooling liquid already poured thereinto is prevented from leaking from the cooling liquid pouring pipe 95, whereby the refilling work can be easily performed. Since the hydrogen gas mixed into the cooling system 79 from the fuel cell 12 is gas, it has the property of moving upward and hence is finally collected in the cooling liquid supply port member 100. Hence, the hydrogen gas mixed into the cooling system 79 can be quickly sensed by the hydrogen sensor 108 mounted in this portion.

Actually, the handlebar 18, the meter 38, and the like are above the head pipe 24. However, it is not suitable that these parts be mounted with the cooling liquid supply port member 100 and the hydrogen sensor 108. That is, with respect to the handlebar 18, the positional relationship between the handlebar 18 and the pipe line 96b is changed by a steering operation and with respect to the meter 38, it is difficult in some cases to fix the cooling liquid pouring pipe 95 from the viewpoint of visibility and strength. As indicated earlier, it is important that the cooling liquid supply port member 100 and the hydrogen sensor 108 be mounted substantially at the highest position in the fuel-cell two-wheeled vehicle 10 so it is easy to sense hydrogen gas.

Moreover, since the hydrogen sensor 108 senses hydrogen gas from gas, it is preferable that the hydrogen sensor 108 not be in contact with the cooling liquid that is liquid. In the present embodiment, a large amount of air is stored near the inside surface of the cap 104 that is the highest portion of the cooling liquid pouring pipe 95 and hence the hydrogen sensor 108 is not dipped in the cooling liquid, which in turn makes it possible to elongate the life of the hydrogen sensor 108 and to sense the hydrogen gas stored in the cooling liquid pouring pipe 95 with reliability. Moreover, when the cooling liquid is refilled, the cap 104 is removed. Hence, there is not a possibility that the cooling liquid will adhere to the hydrogen sensor 108 mounted on the inside surface of the cap 104. In addition, since the cooling liquid supply port member 100 is not mounted with the hydrogen sensor 108 and its mounting member, a funnel 106 can be easily inserted and maintainability improved.

The cooling liquid pouring pipe 95 branches out from the nearly middle portion of the pipe line 96b and passes forward of the head pipe 24. Hence, the cooling liquid pouring pipe 95 is large in length and inner volume and hence can store a large amount of air.

Figure 8:
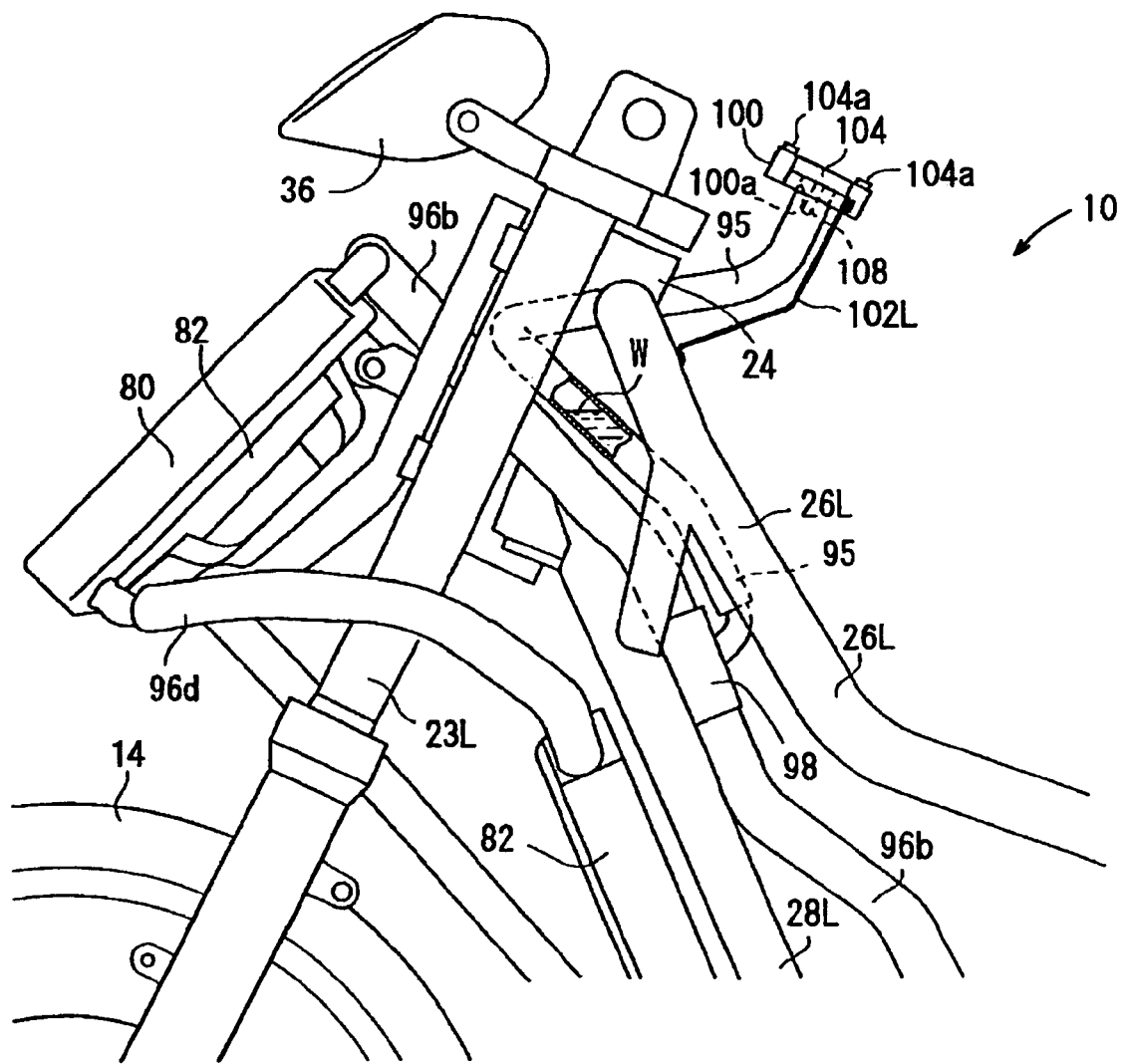
FIG. 8 is a side view, partly in cross section, of the cooling liquid supply pipe and its vicinity.

For example, if the nearly middle position of a portion extending upward to the head pipe 24 from the branch coupling 98 is assumed to be the liquid surface W of the cooling liquid, as shown in FIG. 8, an air region of a large amount of air is secured between the liquid surface W and the cooling liquid supply port member 100. Hence, even if the cooling liquid is a little moved during running, the cooling liquid is prevented from adhering to the hydrogen sensor 108. Further, since the cooling liquid pouring pipe 95 is bent forward of the head pipe 24, even when the cooling liquid is splashed by vibrations, liquid droplets are interrupted by the bent portion, thereby being prevented from adhering to the hydrogen sensor 108. Still further, since a sufficient height is secured between the liquid surface W and the branch coupling 98, air in the upper portion is prevented from passing through the branch coupling 98 and mixing into the pipe line 96b.

Still further, the cooling liquid pouring pipe 95 branches out upward from the pipe line 96b by the branch coupling 98 and hence hydrogen gas or air passing through the pipe line 96b enters the cooling liquid pouring pipe 95 from the branch coupling 98, thereby being collected there, and hence the circulation path of the cooling system 79 is filled with the cooling liquid. With this, hydrogen gas or air having low thermal conductivity is extracted, that is, the releasing of gas is performed. Hence, thermal conductivity is improved and the flow of the cooling liquid is made smooth and the cooling efficiency of the cooling system 79 is improved.

The cooling liquid pouring pipe 95 is long but is mounted along the lower frame 32L and the head pipe 24 to utilize the dead space effectively, so that the cooling liquid pouring pipe 95 does not interrupt the arrangement of the other parts from the viewpoint of designing where the parts are mounted.

Moreover, the first radiator 80, the head light 36, and the like are mounted forward of the head pipe 24 and are covered with the front cover 37 (see FIG. 1), so that there is no empty space. However, the cooling liquid pouring member 100 is mounted in a dead space in the back of the head pipe 24 to utilize space effectively and is arranged at a position where maintenance can be easily performed.

Here, in FIG. 2, FIG. 3, and FIGS. 5 to 8, the seat 22, the front cover 37, the handlebar 18, the head light 36, the meter 38, and the like are omitted as appropriate in the drawing in consideration of the visibility of main parts.

In the above description, assuming that the cooling system 79 is of a water-cooled type, the description has been provided, but the cooling system may be of another liquid-cooled type such as oil-cooled type.

The fuel-cell two-wheeled vehicle in accordance with the present invention is not limited to the above embodiment and, needless to say, can have various constructions without departing from the spirit and scope of the present invention.

What is claimed is:

1. A two-wheeled vehicle powered by electric power generated by supplying reaction gas and hydrogen gas to a fuel cell comprising:

a liquid cooling system for cooling the fuel cell;

a head pipe supporting a front fork for a front wheel in a way as to freely steer the front fork; and a hydrogen sensor provided longitudinally between the head pipe and a seat and closer to the head pipe than the seat and for sensing hydrogen gas leaking from the fuel cell when the hydrogen gas is mixed in the liquid cooling system.

2. The two-wheeled vehicle according to claim 1, further comprising a cooling liquid supply port for receiving a cooling liquid into the cooling system and a cap for said port provided near the head pipe, the hydrogen sensor being mounted on the cap for closing the cooling liquid supply port.

3. The two-wheeled vehicle according to claim 1 wherein the liquid cooling system has a cooling liquid supply port and the hydrogen sensor is removably mounted at the cooling liquid supply port.

4. The two-wheeled vehicle according to claim 2, wherein a cooling liquid pouring pipe extends from a pipe line of the cooling system to the cooling liquid supply port and is formed into a winding path to extend along at least a front portion and side portions of an axis of the head pipe when viewed from top plan.

* * * * *